3 Sheets—Sheet 1.

J. LYALL,

Assignor, by mesne assignments, to R. C. ELLIOTT, Trustee of THE POSITIVE MOTION LOOM COMPANY.

Loom.

No. 9,049.

Reissued Jan. 20, 1880.

Witnesses

Chas. H. Smith
Geo. T. Pinckney

Inventor

James Lyall
for Lemuel W. Serrell
Atty

3 Sheets—Sheet 2.

J. LYALL,

Assignor, by mesne assignments, to R. C. ELLIOTT, Trustee of THE POSITIVE MOTION LOOM COMPANY.

Loom.

No. 9,049. Reissued Jan. 20, 1880.

—Witnesses—

Chas. H. Smith
Geo. T. Pinckney

—Inventor—

James Lyall
for Lemuel W. Serrell
Atty.

J. LYALL,

Assignor, by mesne assignments, to R. C. ELLIOTT, Trustee of THE POSITIVE MOTION LOOM COMPANY.

Loom.

No. 9,049. Reissued Jan. 20, 1880.

Witnesses

Chas. H. Smith
Geo. T. Prickney

Inventor

James Lyall
per Lemuel W. Serrell
atty.

UNITED STATES PATENT OFFICE.

JAMES LYALL, OF NEW YORK, N. Y., ASSIGNOR, BY MESNE ASSIGNMENTS, TO RICHARD C. ELLIOTT, TRUSTEE OF THE POSITIVE MOTION LOOM COMPANY.

LOOM.

SPECIFICATION forming part of Reissued Letters Patent No. 9,049, dated January 20, 1880.

Original No. 133,868, dated December 10, 1872. Application for Reissue filed May 20, 1879.

*To all whom it may concern:*

Be it known that I, JAMES LYALL, of the city and State of New York, have invented and made an Improvement in Looms for Weaving; and the following is declared to be a correct description of the same.

In Letters Patent No. 40,685, granted to J. W. Drummond, there is an endless belt for giving motion to the shuttle propeller or carrier. In this case the belt that gave motion to the shuttle-driver was in a stationary raceway. In Letters Patent No. 80,982, granted to me August 11, 1868, the said belt and shuttle-propeller are on a raceway on the lay itself, and move with it; but the belt extends downwardly to near the axis of the lay-swords, so so that the belt does not become loose.

In my present invention the lever that moves the belt and shuttle-propeller is mounted upon and moves with a lay and its frame, and such lever receives its motion from a crank. I also employ means for accelerating and retarding the movement of the shuttle-propeller and communicating a long movement of the shuttle from a comparatively short crank.

A raceway supports the shuttle, and a shuttle-propeller is moved therein, and the lower shed of warps is near the top of this raceway, so that the shuttle-rollers move over the same, and the shuttle itself is guided with greater precision than in the aforesaid patent.

The shuttle is adapted to taking up any slack thread, and then giving the same out again, without undue strain upon the edge of the fabric from the tension of the weft-threads, and the take-up mechanism is adapted to irregular fabrics, such as corsets, for keeping the edge of the fabric in a straight line while weaving gores.

Figure 1:
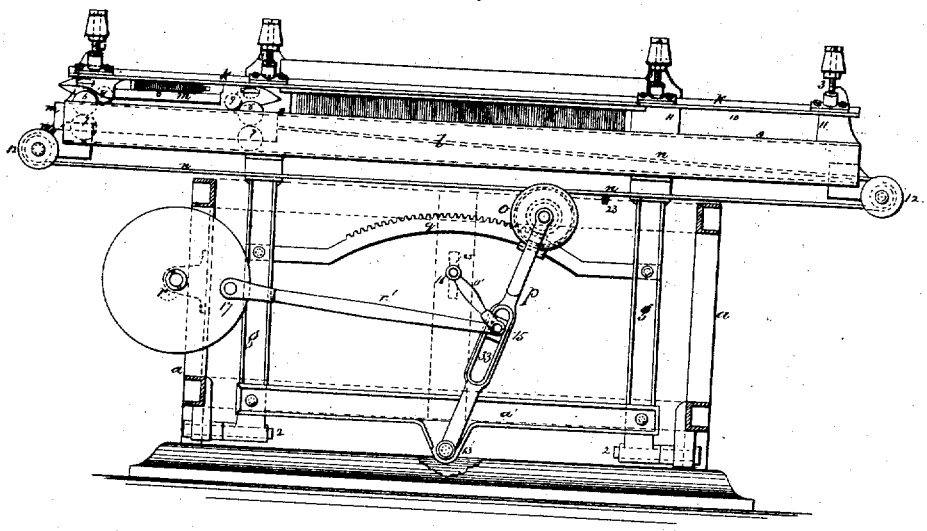
Figure 2:
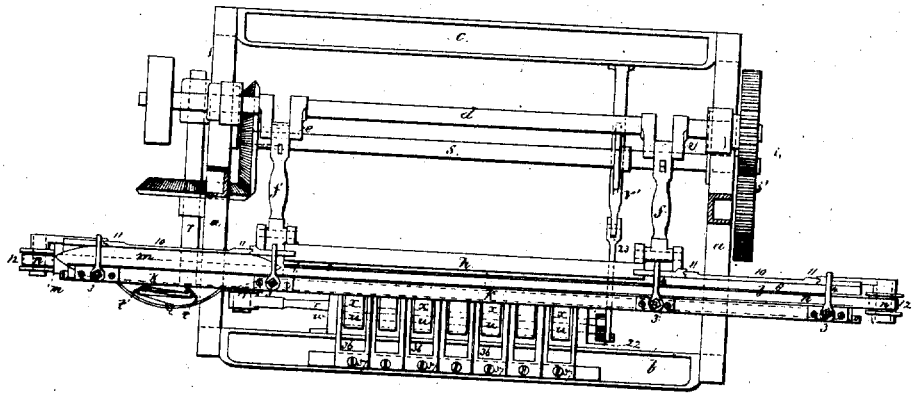
Figure 3:
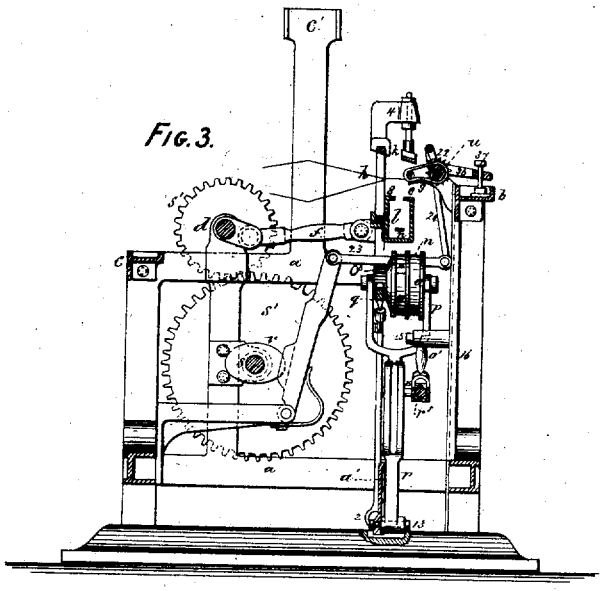
Figure 7:
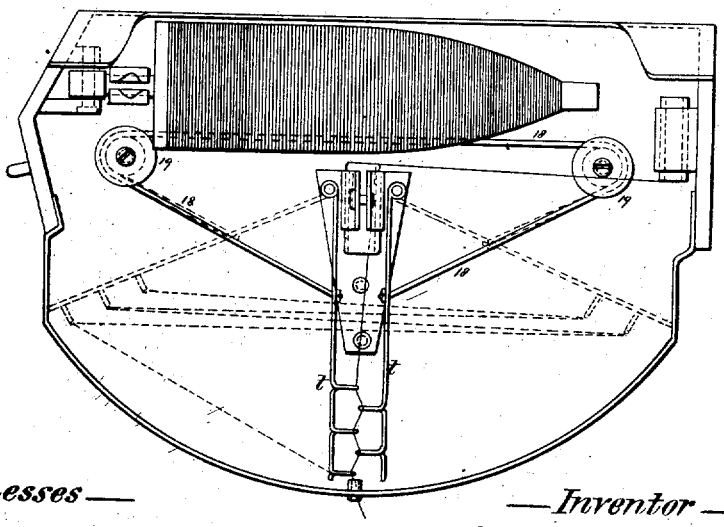
Figure 4:
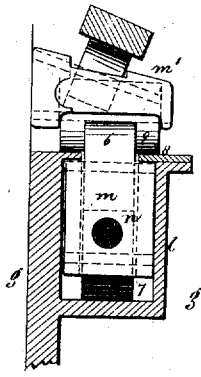
Figure 5:
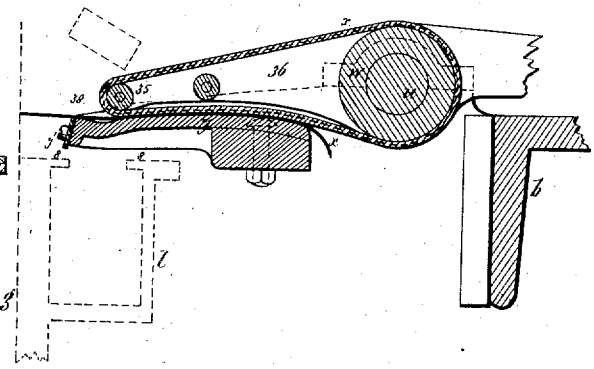
Figure 6:
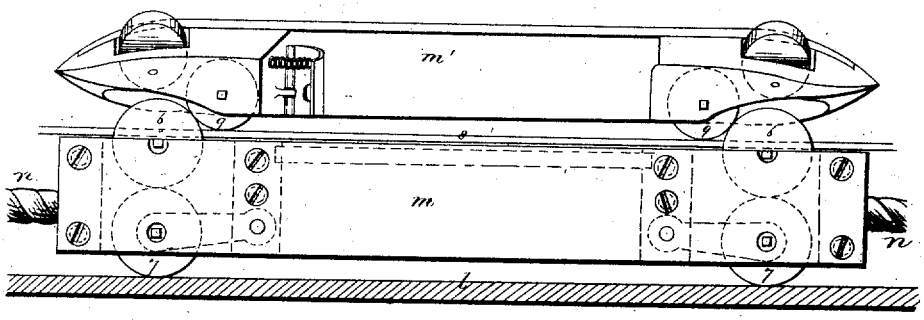

In the drawings, Figure 1 is an elevation, partially in section. Fig. 2 is a plan. Fig. 3 is a section transversely of the lay. Fig. 4 is a section, in larger size, of the raceway for the shuttle and its propeller. Fig. 5 is a section of the take-up mechanism. Fig. 6 is an elevation, about half-size, of the shuttle and its propeller; and Fig. 7 is a plan of the bobbin-holder and weft-regulator separately.

The frame of the loom is made with the ends *a a* connected by the front and back bars, *b c*, of suitable size, and the cords of the jacquard, when that is employed, pass through the frame or harness-board at *c'* in any usual manner.

The main shaft *d* is revolved by competent power, and has cranks *e* for the connecting-rods *f*, that are jointed to the lay-swords *g*, and these are pivoted at 2. The lay carries a reed, *h*, and also the rail *k*, somewhat similar to those in my former patent. I, however, make this rail adjustable by means of screws 3 passing through arms 4, that project above the lay, so as to regulate accurately the space provided for the shuttle between said rail *k* and the raceway *l*. This raceway *l* is adapted to receive the shuttle-propeller *m*, that is made with rollers 6 and 7, substantially the same as in my aforesaid patent; but instead of the device becoming a shuttle-carrier, it is simply a shuttle-propeller, because the shuttle runs upon the ledges 8 at the top of the raceway, the lower rollers, 9, of the shuttle *m'* being made longer, so as to rest upon such ledges, and the rollers 6 of the propeller project up between these ledges sufficiently to act upon the rollers 9, in propelling the same, in a manner similar to that in aforesaid patent.

By this construction the shuttle is held and steadied in place, the rollers 9 taking a broad bearing, and there is not any risk of injury to the warps.

The upper rollers of the shuttle are similar to those in aforesaid patents, and the receiver that carries the bobbin or cop is removable from the shuttle, as in the Patent No. 116,609.

At the ends of the raceway in the lay are the gates 10, that are made to be drawn up vertically in slides 11 in the lay, so as to allow the shuttle to be removed from the widest side of the raceway. The faces of these gates are in line with the surface of the reeds, so as to support the back of the shuttle.

The bands or belts *n*, that are employed to actuate the shuttle-propeller, pass at the ends of the lay over the rollers 12, and receive motion from the motive power acting through mechanism that moves with the frame of the lay.

There is a lever, $p$, that has its fulcrum 13 upon the cross-bar $a'$ of the lay, and this lever is moved by the crank 17 and connecting-rod $r'$ to the pin 15, and gives motion to the shuttle-propeller through the band or belt $n$.

Between the swords of the lay $g$ is a segmental rack-bar, $q$, the teeth of which take the teeth of a pinion on the axis of the roller $o$, to revolve the said roller as the lever $p$, that carries the same, is moved from side to side.

The ends of the band $n$ are to be connected with the roller $o$ in opposite directions, so as to wind and unwind the same, and give the necessary extent of movement to the belt and the shuttle-propeller carried by the same.

The swinging link $o'$ is pivoted to the bar 16 and suspends the pin 15.

The shaft $r$, that revolves the crank 17, receives its motion from the counter-shaft $s$, that is rotated at half the speed of the main shaft $d$ by the gearing $s'$.

It will now be evident that the lever $p$ is vibrated with rapidity, but stopped gradually at each end of the movement, because the crank 17 gives an accelerated movement at the middle of the stroke from the connecting-rod $r'$, and gradually stops the motion, and this would be the case if the connecting-rod were attached directly to the lever $p$, which, in some instances, might be done; but the acceleration is still further increased in the central portions of the stroke and lessened toward the ends in consequence of the crank-pin 15 of the link $o'$ moving in the slot 33, and being nearest to the fulcrum 13 in the middle portion of the movement and farther from the fulcrum at the commencement and ending of each reciprocation, and swinging almost in the line of the slot when the lever is in its diagonal positions at the ends of the movement.

By changing the position of the pivot 25 of the link $o'$ the motion given to the shuttle can be varied without any other change, because the movement will be greater by bringing the pin 15 farther down in the slot toward the fulcrum 13 of the lever $p$, and the reverse. The size of the band-wheel $o$, or of the pinion, also allows for varying the movement of the shuttle.

The segmental rack-bar $q$ revolves the roller $o$, and the upper part of said roller is turning in the same direction in which the roller $o$ is carried bodily. Thereby the band or belt that is wound upon the roller $o$ moves the shuttle-propeller the extent due to the winding up, in addition to that resulting from the change in the position of the roller. Thereby a large extent of motion is given to the shuttle in proportion to the change of position of the roller $o$.

Shuttles have been made with spring-arms carrying eyes for the thread to pass through. I have improved the shuttle by applying an india-rubber cord, 18, passing around pulleys or grooved rollers 19, and attached to the arms $t$, so that a long spring can be introduced in a small space, thereby insuring greater uniformity of tension on the weft-thread, lessening cost of manufacture, and introducing the parts into a small compass. The rubber spring may extend from one arm to the other, as shown, or two pieces may be used, passing around the respective pulleys, and the ends attached to eyes on the shuttle.

In weaving corsets or fabrics with gores or irregular surfaces it is necessary that the material woven should be taken up as woven, in order to present a straight edge for the next weft-thread. In hand-looms this has been accomplished by drawing the goods by weights and hooks and a range of holding-pins and sectional rollers operated by the jacquard, and brushes have also been employed. In all cases it is important that the point of tension from the take-up device should be as near to the reeds at the extreme movement as possible, and where rollers or brushes of a large size are used the grasping-points, being immediately below the centers of the rollers, cannot be close to the point of beating up.

This part of my invention consists in a belt or series of belts passing over an actuating-roller and a small roller, said belt acting against the surface of a curved plate, and thereby obtaining a sufficiently firm hold upon the fabric to draw the material along when pressed toward the belt by the lay in beating up the weft-thread, and when the fabric does not require to be taken up the belt slips on the same. Thereby the point at which the fabric is grasped will be very close to the point of weaving, and the rails of the lay in my loom can pass above and below the take-up apparatus.

The roller $u$ is rotated progressively each blow of the lay by the ratchet and pawl 22, that is moved by the cam $v$, lever $v'$, link 23, and arm 24, and this roller is supported in bearings $w$ at the ends, and may be continuous across the entire width of the fabric, or made to receive the pressure-levers 36 at suitable distances apart. The belt or belts $x$ pass over this roller $u$, and also around the small distending-roller or stretcher 35, that is contiguous to the plate $y$, and the fabric is drawn by the belts as much as the lay presses the same up in beating in the filling. The surface of the plate $y$, being curved upwardly, causes the belt to take a firm bearing thereon, and according to the position of the stretcher or roller 35, as adjusted by the levers 36 and screws 37, so the belt will be drawn more or less tightly over this convex plate $y$. The range of teeth at 38 serve to hold the fabric as the lay recedes. These teeth should be inclined toward the rollers 35, and they are made upon the edge of a plate of steel, $y'$, attached to the edge of $y$, so that they can be positioned much nearer to the point of weaving than the needles heretofore used, because they occupy less room. A second range of endless belts might take the place of the plate $y$, the fabric being drawn in between the belts.

I claim as my invention—

1. The roller $o$ and pinion $o^3$, connected thereto, the stationary rack-bar segment $q$ and lever $p$, in combination with the belt $n$, shuttle and shuttle-driver, and mechanism for moving the lever, substantially as set forth.

2. In combination with the lay, shuttle driver or propeller, and its belt $n$, the lever $p$, roller $o$, mechanism for rotating the roller, the link $o'$, connecting-rod $r'$, crank 17, and crank-pin 15, adapted to engage the lever $p$, substantially as set forth.

3. The lay provided with a raceway having ledges 8, in combination with the shuttle $m'$, rollers 9, shuttle-driver $m$, and its rollers 6, that project up between the ledges 8 and act upon the rollers 9, substantially as set forth.

4. The arms $t$, having eyes for the weft-thread, an elastic cord, and rollers for the same to pass around, in combination with the body of the shuttle, substantially as set forth.

5. The lay made with the inclined top rail, in combination with the arms 4, that rise above the lay, and the adjusting-screws 3, as and for the purposes set forth.

6. The combination, with a vibrating lay carrying the reed and a shuttle-race, of a shuttle-propeller, a belt passing longitudinally of the lay, rollers at the ends of the lay, around which the belt passes and returns below the reed, a crank for giving motion, and mechanism, substantially as specified, upon the lay-frame for connecting the crank with the belt and giving motion to the same and to the shuttle-propeller, substantially as set forth.

7. The lay having rollers near its ends, the belt passing around such rollers, and the shuttle-propeller, in combination with a lever pivoted upon the lay, means for connecting the belt and lever, and mechanism, actuated substantially as specified, for giving motion to the lever and belt.

8. The combination, in a take-up, of an actuating-roller, a second roller or stretcher, a belt or series of belts around these rollers, and a surface toward which the belt presses, substantially as set forth.

9. The adjustable levers 36, in combination with the roller $u$, stretcher 35, feeding-belts $x$, and surface $y$, substantially as set forth.

10. The lever $p$, connecting-rod $r'$, and crank 17 for giving motion to the lever, in combination with the lay, the swinging crank or link $o'$, and the device that connects the rod $r'$ to the lever, whereby the latter is moved nearer to or farther from the fulcrum of the lever and the movement of the lever accelerated or retarded, substantially as set forth.

11. The metallic plate $y'$, having teeth upon its edge, in combination with the plate $y$ and take-up mechanism, substantially as and for the purposes set forth.

Signed by me this 18th day of April, A. D. 1879.

JAMES LYALL.

Witnesses:
GEO. T. PINCKNEY,
CHAS. H. SMITH.